(No Model.)
C. G. COLLINS.
PROCESS OF PURIFYING BRINE.
No. 459,236.  Patented Sept. 8, 1891.
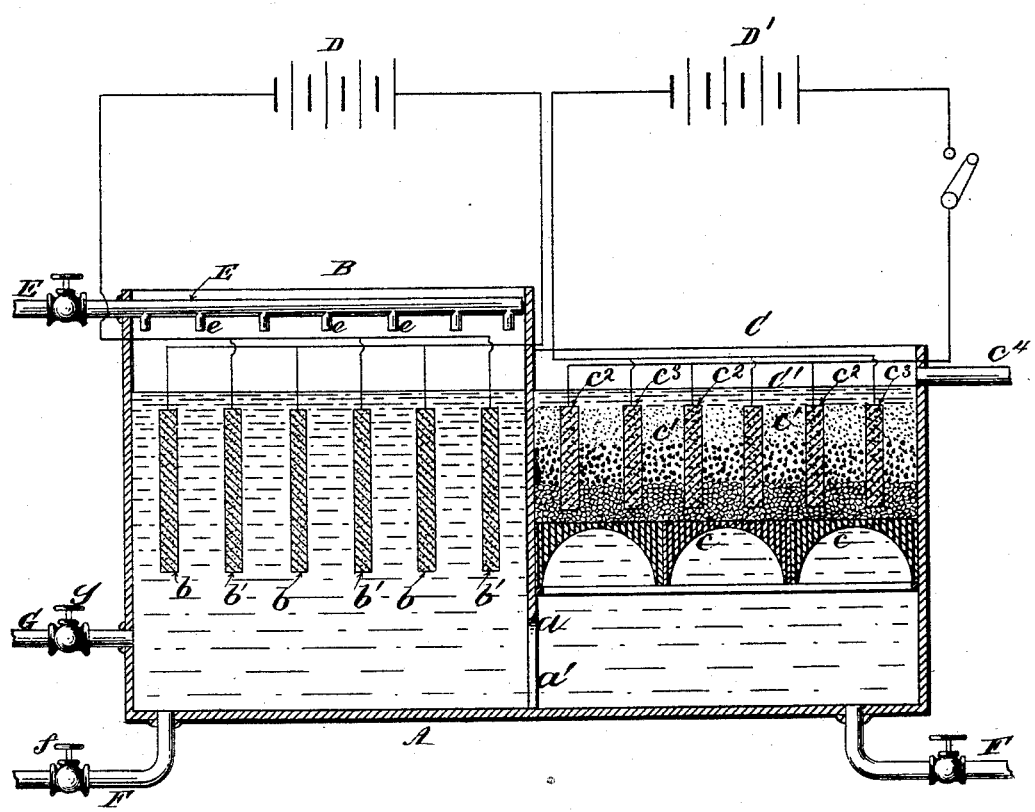
Witnesses:
D. W. Gardner
G. T. Miatt
Inventor:
Caleb G. Collins,
By his attorney
George William Miatt

UNITED STATES PATENT OFFICE.

CALEB GROZIER COLLINS, OF KEARNEY, NEW JERSEY, ASSIGNOR TO C. AMORY STEVENS, OF NEW YORK, N. Y.

PROCESS OF PURIFYING BRINE.

SPECIFICATION forming part of Letters Patent No. 459,236, dated September 8, 1891.

Application filed December 2, 1890. Serial No. 373,300. (No model.)

*To all whom it may concern:*

Be it known that I, CALEB GROZIER COLLINS, a citizen of the United States, residing in Kearney, in the county of Hudson and State of New Jersey, have invented a certain new and useful Process for Effecting the Purification of Brine, of which the following is a description sufficient to enable others skilled in the art to which the invention appertains to use the same.

My invention relates to the purification of brine for the manufacture of common salt (choride of sodium) and for other purposes; and it consists, primarily, in subjecting the brine to a current of electricity having an electro-motive force not exceeding two and one-half volts in intensity, which, while it is sufficient to decompose most of the impurities contained in the brine, is insufficient to decompose the chloride of sodium, the decomposition of these impurities resulting in the formation of insoluble precipitates, which may be removed by mechanical means, as more fully set forth hereinafter.

A secondary feature of my invention consists in first treating the brine with electricity, as above set forth, and then effecting the prompt and positive removal of the impurities thus rendered insoluble by filtration. Since, however, certain substances when present in a brine have a tendency after having been rendered insoluble by decomposition, as above set forth, to redissolve before they can be eliminated therefrom, my invention in this connection includes the filtration of the brine while under the influence of an electrical current, whereby the precipitated impurities are prevented from redissolving, the current of electricity being of an electro-motive force not exceeding two and one-half volts in intensity, so as to avoid the decomposition of the chloride of sodium.

In the accompanying drawing I illustrate symbolically apparatus suitable for carrying out my improved process of purifying brine, although I do not confine myself to the use of any special construction or arrangement of parts, since it is obvious that the apparatus may be varied or modified materially and still be adapted to meet the practical and essential requirements of my invention.

The drawing shows a tank A divided into two compartments B and C by the vertical partition $a$. In the first compartment B are arranged a series of anodes $b$ and cathodes $b'$, connected with the respective poles of a battery D or other suitable source of electricity. A supply-pipe E is arranged above the electrodes $b\ b'$, and is preferably formed with a series of discharge-openings $e$, arranged to distribute the supply of brine uniformly to the tank, and any suitable number of these supply-pipes may be employed in effecting this result.

The bottom of the tank B is provided with a discharge-pipe F, through which the solid precipitates may be carried off, and with a brine-discharge pipe G, arranged at a suitable level, through which the brine may be withdrawn after being subjected to the action of the electric current and allowed to settle. Both discharge-pipes F and G are provided with valves $f$ and $g$, respectively.

There is an opening $a'$ in the partition $a$ of the tank A, which opening establishes communication between the two compartments B and C. In the compartment C, above the opening $a'$, is situated a horizontal partition or floor $c$, formed with a series of perforations through which the brine is enabled to rise upward into the filtering-chamber C', provided with a suitable filtering medium $c'$, preferably having embedded in it a series of electrodes $c^2\ c^3$, connected alternately with the positive and negative poles of the battery D' or other suitable source of electricity in such manner that the current may be thrown on or off the filtering material $c'$ at pleasure.

The filtering-chamber C' is provided with an outlet or overflow pipe $c^4$, which is above the filtering material, but on a lower level than that of the supply-pipe E, so that the purified brine will flow off naturally by hydrostatic pressure.

It is well known that the character of the impurities found with salt varies in the different sources of supply, the deposits of rock-salt, the salt-springs, and even the natural sea-waters differing in composition.

The most common impurities in the natural deposits of salt and the brine arising therefrom are ferrous bicarbonate, calcium bicarbonate, magnesium bicarbonate, calcium sulphate, calcium chloride, magnesium chloride, and earths and clays and organic matter. The sea-waters contain chlorides of potassium, calcium, and magnesium, bromides of sodium and magnesium, sulphates of lime and magnesium, and carbonates of magnesium and lime. I have found by experimental research that in the presence of an electrical current of less intensity than two and one-half volts some of these may be decomposed, rendered insoluble, and precipitated therefrom without danger of the decomposition and loss of chloride of sodium. Thus by passing a current of electricity of proper intensity and duly regulated to protect the chloride of sodium through the brine prior to subjecting it to evaporation for the purpose of effecting the concentration and crystallization of the salt the decomposition of the deleterious substances contained in the brine, either in solution or suspension, and their separation therefrom may be readily and economically effected. For instance, calcium bicarbonate in solution under the influence of an electrical current of less than two and one-half volts will be decomposed, carbonic acid being liberated at the anode and calcic hydrate at the cathode, (according to reaction $CaH_2(CO_3)2 = CaH_2O_2 + 2CO_2$.) The calcic hydrate thus liberated reacts on another equivalent of calcic bicarbonate to form neutral calcic carbonate, which is insoluble and is precipitated, $(CaH_2O_2 + CaH_2(CO_3)2 = 2CaCO_3 + 2H_2O$.) Again, sulphate of lime in solution under the influence of an electrical current of less than two and one-half volts will be decomposed, sulphuric acid being liberated at the anode and calcic hydrate at the cathode, $(CaSO_4 + 2H_2O = H_2SO_4 + CaH_2O_2$.) In the presence of bicarbonate of lime in the brine the calcic hydrate thus liberated reacts on an equivalent of bicarbonate of lime to form neutral calcic carbonate, which is insoluble and is precipitated. In substantially like manner calcium chloride, magnesium bicarbonate, magnesium sulphate, and magnesium chloride will suffer decomposition and precipitation.

My process is especially applicable to the removal of the bases of the above and kindred compounds. It is also applicable to the removal of ferrous bicarbonate by oxidation resulting from the decomposition of water.

In operation the brine is simply introduced into the tank B by the supply pipe or pipes E, being thereby subjected to the influence of the electrical currents passing between the anodes $b$ and cathodes $b'$, resulting in the partial decomposition of the water and the decomposition of some of the impurities of the brine. The insoluble precipitates thus formed may be allowed to settle to the bottom and be eventually removed through the discharge pipe or pipes F or by other means, while the purified brine may be conducted off by the discharge-pipe G, or the impurities may be positively separated and eliminated from the brine by causing the latter to flow through a filtering material $c'$ preparatory to its discharge for evaporation and crystallization.

When the brine is of such a character that the impurities, after decomposition in the tank B, are liable to recombine to form soluble compounds, when beyond the influence of the electrical current I connect the anodes and cathodes in the filtering material $c'$ alternately with the poles of a battery D' or other source of electricity, care being taken to duly regulate and maintain the current at an intensity below two and one-half volts, in which case these soluble compounds, if so formed, are again decomposed into insoluble products and positively removed from the filtering-brine. An electrical current of two and one-half volts intensity is sufficient to decompose the impurities in brine, as hereinbefore set forth, for the reason that their chemical affinities, expressed in electrical terms, are in each case less than the voltage described. With sodium chloride, on the contrary, the affinity between the sodium and the chlorine, expressed in electrical terms, is greater than the aforesaid voltage; and the essential feature of my invention consists in the discovery by experimental investigation of this fact and its practical utilization in the purification of brine.

The importance of removing all traces of iron from the brine is obvious in view of its injurious effects on the color of the salt if allowed to remain. Hence the decomposition of the iron compounds and their oxidation and consequent precipitation under the influence of the electrical current simultaneous with the decomposition of the other impurities are another important feature of my improved process.

I am aware that in the patent to Webster, dated August 8, 1888, No. 387,467, filtration is described as conducted under the influence of an electrical current; but in that case the object is the oxidation of animal matter, and I do not seek to cover herein the equivalent of the process therein set forth; neither do I wish to cover, broadly, the idea of the filtration of a liquid solution while under the influence of electricity; but

What I claim as my invention, and desire to secure by Letters Patent, is—

1. The process of purifying brine, substantially as herein set forth, consisting in rendering the impurities insoluble by subjecting the brine to a current of electricity having an electro-motive force not exceeding two and one-half volts, sufficient to decompose the impurities in the brine, but below the intensity necessary to decompose the sodium chloride in the brine, whereby the impurities are rendered insoluble through decomposition, while the sodium chloride is unaffected by the electric current.

2. The process of purifying brine, as herein set forth, consisting in rendering the impurities insoluble by subjecting the brine to a current of electricity having an electro-motive force not exceeding two and one-half volts in intensity, and then separating the brine from such precipitates by passing it through a filtering medium, substantially in the manner and for the purpose described.

3. The process of purifying brine, as herein set forth, consisting in rendering the impurities insoluble by subjecting the brine to a current of electricity having an electro-motive force not exceeding two and one-half volts in intensity, and then separating the brine from such precipitates by passing it through a filtering medium while under the influence of an electrical current not exceeding two and one-half volts in intensity to insure the re-precipitation and removal of such impurities as tend to redissolve after passing beyond the influence of the first electrical current, substantially as described.

4. The process of purifying brine, as herein set forth, consisting in rendering impurities insoluble and simultaneously removing them from the brine by passing the latter through a filtering medium in which it is subjected to a current of electricity having an electro-motive force not exceeding two and one-half volts in intensity, substantially in the manner and for the purpose described.

CALEB GROZIER COLLINS.

Witnesses:
GEORGE WILLIAM MIATT,
D. W. GARDNER.